May 16, 1950 P. H. CARNELL 2,507,764
CONVERSION OF ACID-SOLUBLE OILS
Filed March 18, 1946
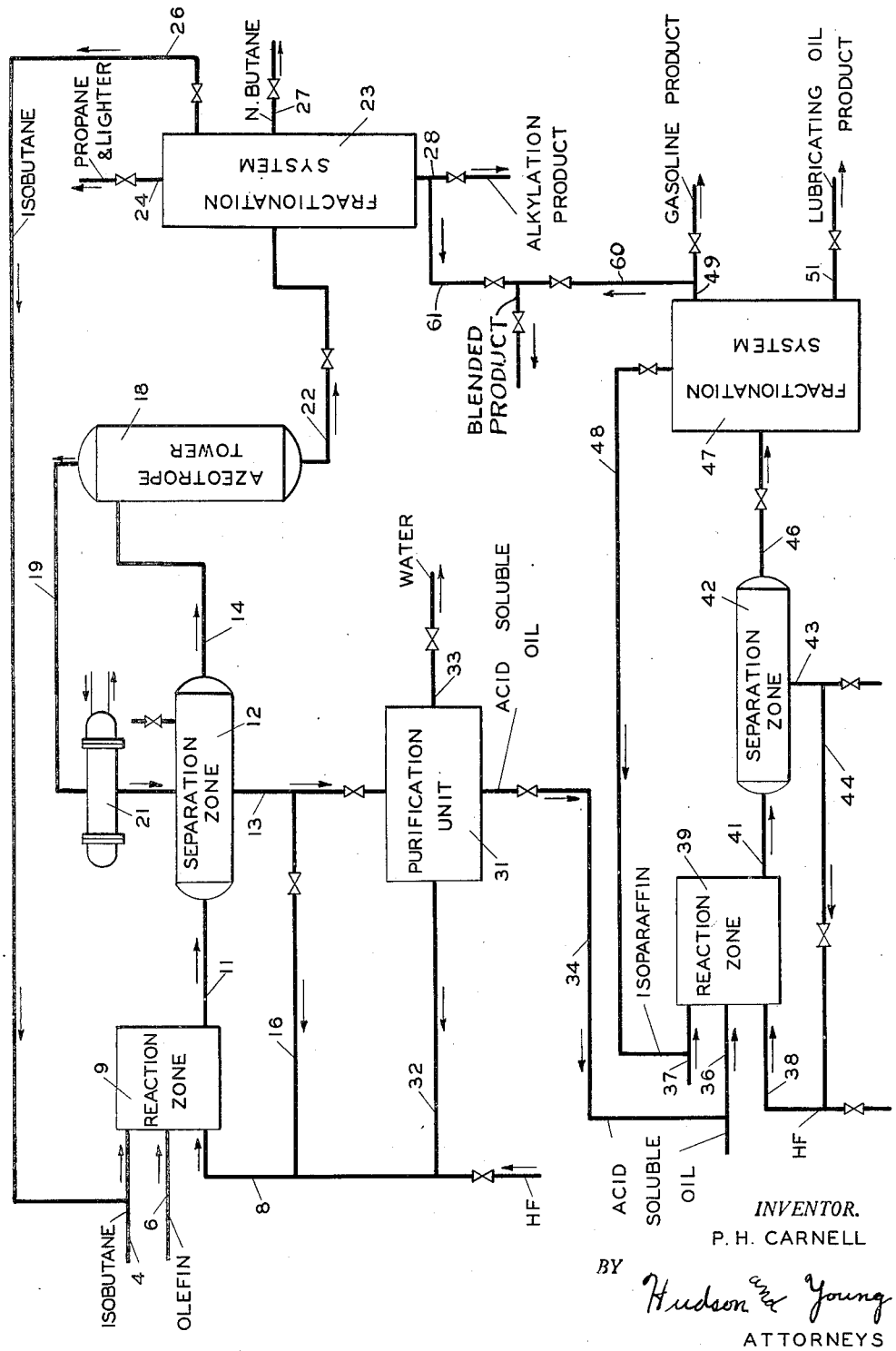
INVENTOR.
P. H. CARNELL
BY Hudson & Young
ATTORNEYS Patented May 16, 1950

2,507,764

UNITED STATES PATENT OFFICE 2,507,764

CONVERSION OF ACID-SOLUBLE OILS

Paul H. Carnell, Bartlesville, Okla., assignor to Phillips Petroleum Company, a corporation of Delaware Application March 18, 1946, Serial No. 655,224

10 Claims. (Cl. 260—683.4)

This invention relates to the conversion of hydrocarbons. In one aspect this invention relates to the conversion of acid-soluble oils. In another aspect this invention relates to the utilization of acid-soluble oils obtained as a by-product from a hydrofluoric acid alkylation process. Still another aspect of this invention relates to the production of high octane quality motor fuels and of lubricating oils.

Perhaps one of the most important industrial processes during the war and at the present time is the alkylation of hydrocarbons in the presence of hydrofluoric acid as the catalyst. Such so-called hydrofluoric acid alkylation involves the reaction of an isoparaffin, particularly isobutane and/or isopentane, with an alkylating reactant, particularly an olefin, such as propylene, various butylenes, various amylenes and other higher boiling olefins, to produce normally liquid paraffins which generally have high octane numbers and are quite valuable as constituents of aviation fuel. In such alkylation processes the reactants are intimately contacted at temperatures between about 50 and about 150° F. and under sufficient pressure to maintain reactants in the liquid phase with liquid concentrated hydrofluoric acid for a reaction period ranging from about 1 to about 30 minutes. The mole ratio of paraffin to olefin in the feed is usually about 3:1 to about 20:1, and as high as 100:1 in the reaction zone itself. The resulting reaction effluent is passed to a settling zone wherein a liquid hydrocarbon-rich phase and a heavier liquid hydrofluoric acid-rich phase are formed and separated. The hydrocarbon phase from the settling zone may be then subjected to fractional distillation to remove hydrogen fluoride dissolved therein, which is generally present to the extent of about 1 to about 3 per cent by volume. After removal of the hydrogen fluoride from the hydrocarbon phase, the remaining portion of the hydrocarbon phase is passed to a separation or distillation zone for the removal and recovery of the alkylation product. This product of the process comprises, in general, alkylated hydrocarbons, such as isooctanes, heptanes and hexanes and some pentanes, of high anti-knock quality.

The acid phase from the separation zone is recycled directly to the alkylation reaction zone; however, since the acid phase becomes contaminated with water and other impurities, a portion of the acid phase is passed to a purification system for the removal of water and other impurities. One of the impurities besides water which is removed from the acid phase in the purification system is the so-called acid-soluble oils. These acid-soluble oils, which are referred to in the copending application of Frederick E. Frey, Serial No. 429,961, filed February 7, 1942, now matured to U. S. Patent No. 2,494,867 and which are a by-product of the alkylation reaction, vary considerably in composition but are, in general, normally liquid materials and are soluble in hydrogen fluoride and at least partially soluble in hydrocarbons and less soluble in water. They appear to have a tendency to reduce the catalytic activity of the hydrofluoric acid and to vary the course of alkylation reaction, thus necessitating their removal from the acid phase of the alkylation process. The amount of these acid-soluble oils which is formed may amount to about 1 to 2 per cent to as high as about 10 per cent of the acid phase. A typical acid-soluble oil has the following characteristics:

Table I

| | |
|---|---|
| Specific gravity at 25° C | 0.8881 |
| Refractive index at 20° C | 1.5013 |
| Unsaturation (cc. 1% bromine soln. per cc.) | 34.9 |
| Sulfur, per cent by wt | 2.17 |
| Fluorine, per cent by wt | 0.0013 |
| Color | Dark red to brown in transmitted light |
| Aniline point | 35° C. |

The sulfur in this acid-soluble oil probably originates for the most part from impurities present in the hydrocarbons treated and in smaller part from the hydrofluoric acid used in the particular alkylation.

Several methods are known to those skilled in the art for removing water and acid-soluble oils from the acid phase. A typical and generally used method comprises passing the acid phase to a series of distillation columns. The first column comprises, in general, a flash distillation column in which hydrogen fluoride and water pass overhead as a vapor and acid-soluble oils containing some free hydrogen fluoride are removed as a bottom product. The hydrogen fluoride and water overhead is passed to the second distillation column in which substantially anhydrous hydrogen fluoride is removed as an overhead fraction and a liquid azeotropic mixture of water and hydrogen fluoride is removed as a bottom fraction. The anhydrous hydrogen fluoride overhead fraction is recycled to the reaction zone and the azeotropic mixture of hydrogen fluoride and water is usually discarded or further treated to recover the hydrogen fluoride therefrom. This invention constitutes a process for utilization of the acid-soluble oil by-product recovered in the acid purification system.

The object of this invention is to provide a novel hydrocarbon conversion process.

Another object is to provide a process for the conversion of acid-soluble oils in the presence of hydrofluoric acid as a catalyst.

Another object of this invention is to provide a method for decreasing the operational and material cost of an alkylation process.

Still a further object of this invention is to provide an integrated alkylation process in which an alkylation by-product of a first alkylation reaction is converted in a second reaction to produce a valuable product.

Still another object of this invention is to provide a process for the manufacture of a high quality motor fuel and a lubricating oil having an improved viscosity index.

It is yet another object to manufacture an improved lubricating oil.

Further objects and advantages will become apparent to those skilled in the art from the accompanying description and disclosure.

According to this invention an alkylatable hydrocarbon is reacted with acid-soluble oil in the presence of an alkylation catalyst under alkylation conditions such that a hydrocarbon product useful as a motor fuel and/or lubricating oil is produced. In a preferred embodiment of the present invention a low-boiling isoparaffin, such as isobutane or isopentane, is alkylated with an olefin in a first alkylation step in the presence of a hydrofluoric acid alkylation catalyst under conditions such that higher boiling hydrocarbons are produced. The resulting effluent from the first alkylation step is separated into a liquid hydrocarbon-rich phase and a liquid hydrofluoric acid-rich phase; a gasoline fraction comprising higher boiling hydrocarbons is recovered from the hydrocarbon phase and acid-soluble oils are recovered from the hydrofluoric acid phase. In a second conversion step a low-boiling isoparaffin, such as isobutane or isopentane, is reacted with said acid-soluble oils in the presence of a hydrofluoric acid catalyst under alkylation conditions such that paraffinic hydrocarbons boiling in the gasoline range and in the lubricating oil range are produced as products of the second conversion step. The hydrocarbons boiling in the gasoline range and the hydrocarbons boiling in the lubricating oil range from the second conversion step are recovered as separate fractions, respectively. The hydrocarbon fraction boiling in the gasoline range from the second conversion step may be combined with the gasoline fraction from the first alkylation step to form a high octane quality motor fuel.

The acid-soluble oil fraction which is reacted with an isoparaffin under conditions hereinafter set forth has an API gravity between about 15 and about 30 degrees and an iodine number (a measurement of unsaturation) between about 100 and about 175. Generally, the 10–90 volume per cent boiling range, determined by vacuum distillation and corrected to 760 mm. pressure, is within the range between about 300 and about 1000° F. About 30 to about 35 per cent of the acid-soluble oils comprises non-volatile material at atmospheric pressure. The color of the acid-soluble oil fraction varies from light yellow to a dark red. The composition of the acid-soluble oil fraction indicates that a large portion thereof is unsaturate polymers and a small portion is such impurities as sulfur, fluorine and water.

Various fluid alkylation catalysts, such as sulfuric acid, hydrofluoric acid, and these catalysts combined with suitable promoters may be employed for catalyzing the reaction of the isoparaffin with the acid-soluble oil without departing from the scope of this invention.

Under the preferred conditions of reaction of a low-boiling isoparaffin with the acid-soluble oil fraction, a temperature between about 100 and about 400° F. is generally used; and a preferred temperature range is between about 150 and about 300° F. A pressure between about 100 and about 2000 pounds per square inch gage may be used; and a preferred pressure range is between about 650 and about 900 pounds per square inch gage. An increase in temperature increases the yield of products boiling within the gasoline range and decreases the yield of products boiling in the lubricating oil range. Generally, sufficient pressure is maintained at all times to assure conversion in the liquid phase; however, conversion in the vapor phase is within the scope of this invention. For optimum yield of the desired product of the conversion of the acid-soluble oils an excess of paraffin to olefin is desired, thus the mole ratio of paraffin to acid soluble oil in the feed to the alkylation zone is usually between about 4:1 to about 20:1 and preferably much higher in the conversion zone itself. A suitable volume ratio of hydrofluoric acid catalyst to hydrocarbon during the conversion is about 1:1; a ratio between about 0.5:1 and about 4:1 is suitable. Reaction conditions for the conversion of acid-soluble oils other than those disclosed above may be practiced without departing from the scope of this invention. Conditions best suited for the conversion of a particular isoparaffin with a particular acid-soluble oil fraction may be found by trial and error.

Under the operating conditions disclosed for the reaction of an isoparaffin with an acid-soluble oil two hydrocarbon fractions are generally obtained, namely, a fraction boiling within the gasoline range and a heavier fraction boiling within the lubricating oil range. The gasoline fraction comprises paraffinic hydrocarbons of high octane quality and boils within a range between about 110 and about 410° F. The lubricating oil fraction is composed almost entirely of paraffinic hydrocarbons and has an improved viscosity index. This lubricating oil fraction may have an API gravity between about 18 and about 28 and a Saybolt viscosity of about 50 to 900 SUS at 100° F.

Although it is not considered limiting to the scope of this invention, the type of reaction in the conversion of the acid-soluble oil is believed to be simultaneous alkylation, disproportionation and hydrogen transfer. The disproportionation and hydrogen transfer reactions account to a large extent for the formation of the hydrocarbons boiling in the gasoline range. By varying the reaction conditions any one of the above types of reaction may be made to predominate during the conversion; thus, if an increased yield of lubricating oils is desired, the alkylation reaction should be made to predominate and, if an increased yield of the gasoline fraction is desired, the disproportionation and hydrogen transfer reactions should be made to predominate. As previously mentioned, increasing the temperature of reaction increases the yield of hydrocarbons boiling in the gasoline range probably because the disproportionation reaction predominates at increased temperatures.

The invention may perhaps be more adequately understood by reference to the accompanying drawing and description thereof. The drawing represents diagrammatically a preferred arrangement of apparatus elements and flow of material therethrough in which the process of the present invention may be practiced. While the elements essential to the understanding of the invention are shown in the drawing, it will be appreciated that various auxiliary pieces of equipment may be provided by one skilled in the art without departing from the scope of this invention.

In this invention as applied to the alkylation of isobutane with olefins in the presence of hydrofluoric acid as the alkylation catalyst, a suitable and typical feed stock for the hydrofluoric acid alkylation in which the acid-soluble oils are a by-product appears in Table II below:

*Table II*

| Component: | Mol per cent |
|---|---|
| Isobutane | 68 |
| Isobutylene | 4 |
| Normal butylene | 7 |
| Butane | 20 |
| Other hydrocarbons | 1 |
| | 100 |

Such a hydrocarbon feed enters reaction zone 9 through lines 4 and 6 and is intimately contacted with hydrofluoric acid, which enters through line 8 and which has a titratable acidity of about 80 to about 95 per cent by weight. The overall mol ratio of isoparaffin to olefin is usually from about 4:1 to about 20:1 in the combined feed and recycle (line 26) and much higher in the reaction zone. The time of residence of the reaction mixture in the reaction zone 9 is usually from about 5 to about 15 minutes but it may be for shorter or longer periods as desired. The volume ratio of acid to hydrocarbon is between approximately 0.5:1 and about 2:1, generally about 1:1 although other ratios may be maintained. The hydrocarbon feed stock enters the alkylation process at a temperature of about 80 to about 100° F. and a pressure of about 90 to 100 pounds per square inch gage. Should it be desired however, both higher pressures and higher temperatures may be used. In general, only sufficient pressure to assure liquid phase operation is necessary. From reaction zone 9 a hydrocarbon conversion effluent is passed by line 11 to separation zone 12 in which the effluent separates into two liquid phases, namely, a lighter hydrocarbon-rich phase and a heavier hydrogen fluoride-rich phase. The hydrogen fluoride-rich phase is withdrawn from the bottom of separation zone 12 through line 13 to be recycled as a catalyst for the alkylation reaction through lines 16 and 8. Fresh make-up hydrofluoric acid may be added to the system through line 8, when desired. Since it is desirable to remove water and acid-soluble oils from the acid phase in order to assure the proper function of the catalyst, a portion or all of the hydrogen fluoride phase is passed to a purification unit 31; the operation of which will be discussed hereinafter. In purification unit 31 water and acid-soluble oils are removed through lines 33 and 34, respectively. A purified anhydrous acid phase is passed from purification unit 31 through lines 32 and 8 to the reaction zone 9.

The liquid hydrocarbon-rich phase passes from separation zone 12 through line 14 to azeotrope tower 18. Separation of a vaporous azeotropic mixture of hydrocarbon and hydrogen fluoride from the hydrocarbon phase is effected in azeotrope tower 18. The azeotropic mixture passes as a vapor from tower 18 through line 19 and condenser 21 to separation zone 12. A liquid hydrocarbon stream, substantially free from hydrogen fluoride but containing a small amount of organic fluorine compounds is removed from the bottom of azeotrope tower 18 by means of line 22 and is passed to a bauxite treater (not shown). The organic fluorine compounds, which are formed as by-products of the hydrocarbon conversion, are removed by treatment with the bauxite.

The liquid hydrocarbon stream, substantially free from organic fluorine compounds, passes through line 22 to fractionating system 23, which may represent either a single deisobutanizer or a series of fractionators for the separation and recovery of the various products of the hydrocarbon conversion. The liquid hydrocarbon stream in line 22 has approximately the composition shown in Table III at this point in the process.

*Table III*

| Hydrocarbon component: | Mol per cent |
|---|---|
| Propane and lighter hydrocarbons | 1 |
| Isobutane | 57 |
| Normal butane | 20 |
| Alkylate | 22 |
| | 100 |

A relatively light hydrocarbon fraction is removed from fractionation system 23 through line 24. This light fraction removed through line 24 comprises propane and lighter hydrocarbons and may be vented or used as fuel. Another fraction containing primarily isobutane is removed from fractionating system 23 through line 26 and recycled to reaction zone 9. A normal butane fraction is removed from fractionation system 23 through line 27 and may be utilized as a fuel, etc., or passed to an isomerization system (not shown) for the isomerization of the normal butane to isobutane for use in the alkylation reaction. The alkylation product of the process is withdrawn from fractionation system 23 through line 28. This alkylation product comprises a relatively light alkylate fraction containing isooctanes, heptanes and hexanes, and a relatively heavy alkylate by-product fraction. The heavy alkylate by-product may be separated from the light alkylate product in another fractionation zone (not shown).

The purification unit 31 may comprise any suitable method and apparatus known to those skilled in the art for the removal and separation of water and acid-soluble oils from the acid phase. Generally, unit 31 will be a series of fractionation steps, the first step of which removes the acid-soluble oils from the acid phase as a bottom product.

The following data in Table IV for an acid-soluble oil fraction is typical of that acid-soluble oil fraction withdrawn from purification unit 31 by line 34:

Table IV

| | |
|---|---|
| Gravity, API | 16.4 |
| Flash point, F | 230.+ |
| Pour point, F | 80 |
| Viscosity at 210 F. SUS | 292 |
| F, wt. per cent | 2.30 |
| S. wt. per cent | 1.19 |
| Iodine number [1] | 113 |
| ASTM Distillation, F vol. per cent distilled: | |
| First drop | 220 |
| 5 | 480 |
| 10 | 546 |
| 20 | 584 |
| 30 | 604 |
| 40 | 618 |
| 50 | 627 |
| 60 | 635 |
| 70 | [2] 640 |

[1] Cg iodine absorbed by 1 gm. sample.
[2] Cracking began.

The acid-soluble oil constitutes about 8 to 9 weight per cent of the acid phase.

Such an acid-soluble oil fraction from line 34 or from any other convenient source is introduced into reaction zone 39 through line 36 where it is contacted with an isoparaffin, which is introduced into reaction zone 39 through line 37. Hydrofluoric acid is passed to reaction zone 39 through line 38 and the resulting mixture of hydrofluoric acid, isoparaffin and acid-soluble oils are intimately mixed under alkylation conditions such that a desired hydrocarbon product is produced. The alkylation reaction is effected at a temperature between about 150 and about 300° F. and a pressure of about 650 to about 900 pounds per square inch gage. A considerable excess of isoparaffin, usually greater than about 20:1, is maintained in the reaction zone. A suitable volume ratio of acid to hydrocarbon is about 1:1; however, other ratios lower or higher than this ratio may be used without departing from the scope of this invention. The resulting effluent from reaction zone 39 is passed to separation zone 42 through line 41. In separation zone 42 a lighter liquid hydrocarbon-rich phase is separated from a heavier liquid hydrofluoric acid-rich phase. The acid-rich phase containing any unreacted acid-soluble oils is recycled through lines 43, 44 and 38 to reaction zone 39. A portion of the acid phase may be withdrawn from the system through line 43 for purification, if desired. Fresh make-up hydrofluoric acid may be added to the system through line 38. The hydrocarbon phase in separation zone 42 is removed therefrom through line 46 and passed to fractionation system 47 which may represent a single or series of fractionators. In fractionation system 47 an isoparaffin fraction is separated and recycled to the reaction zone 39 through lines 48 and 37. A gasoline fraction, a product of the process, is separated and removed from fractionation system 47 through line 49. A lubricating oil fraction, also a product of the process, is separated and removed from fractionating system 47 through line 51.

The gasoline fraction in line 49 may be combined through line 60 with the alkylation product from fractionation system 23 in line 61 to form a motor fuel of high anti-knock quality. If desired, the gasoline and lubricating oil fractions from fractionation system 47 may be treated with suitable agents, such as bauxite or alumina, to remove small amounts of hydrogen fluoride or organically combined fluorine. The gasoline fraction obtained is paraffinic in nature and has a boiling range between about 110 and 410° F. The lubricating oil fraction is highly paraffinic and has an increased viscosity index.

The following examples are offered for better understanding the nature and application of the invention and are not considered limiting to the invention in any respect.

Example I

Isobutane was alkylated with butylene in the presence of hydrofluoric acid at about 90° F. and under a pressure of about 100 pounds per square inch gage to produce an alkylate product boiling within the gasoline range. The overall mol ratio of isobutane to butylene was about 6:1 and the contact time about 10 minutes; the volume ratio of hydrocarbon to acid was about 1:1 and the acidity of the acid phase was about 85 to 90 weight per cent. Acid-soluble oils amounting to about 10 per cent of the acid phase were recovered and vacuum distilled with the following results:

[Vacuum distillation corrected to 760 mm. pressure]

| Vol. Per Cent Distilled | Overhead Temp., °F. |
|---|---|
| 10 | 400 |
| 30 | 545 |
| 50 | 655 |
| 70 | 775 |
| 90 | 940 |

Example II

Isobutane was alkylated with a $C_6$ and heavier hydrocarbon fraction in the presence of hydrofluoric acid. The alkylation conditions and the composition of the $C_6$ and heavier hydrocarbon fraction are shown below:

| | |
|---|---|
| Composition of hydrocarbon feed, wt. per cent: | |
| Propane | 0.1 |
| Isobutane | 42.6 |
| Normal butane | 1.1 |
| Hexenes | 8.5 |
| Hexanes | 21.3 |
| Heptenes | 2.9 |
| Heptanes | 5.5 |
| Octenes | 3.7 |
| Octanes | 9.7 |
| Nonenes | 0.6 |
| Nonanes | 2.3 |
| Decenes and undecenes | 0.1 |
| Decanes and undecanes | 0.8 |
| Heavier hydrocarbons | 0.8 |
| | 100.0 |
| Average mol. wt. of olefins | 95.4 |
| Mol ratio of isobutane to olefin | 4.4 |
| Temperature, F | 91 |
| Pressure, p. s. i. g | 140 |
| Contact time, minutes | 10.3 |
| Volume ratio of acid to hydrocarbon | 1.15:1 |
| Acidity of acid phase, wt. per cent | 81 |
| Acid-soluble oil, wt. per cent of acid phase | 10.4 |

The recovered acid-soluble oil was vacuum distilled with the following results:

[Vacuum distillation corrected to 760 mm. pressure]

| Overhead Temp., °F. | Vol. Per Cent Distilled |
|---|---|
| 320 | 10 |
| 455 | 30 |
| 565 | 50 |
| 650 | 70 |
| 750 | 90 |

From Examples I and II, the similarity between the acid-soluble oils obtained from the alkylation of isobutane with a low-boiling olefin and with a relatively higher boiling olefin fraction is apparent. The yield of acid-soluble in both Examples I and II was about the same, about 10 weight per cent of the acid phase. In general, about 10 volume per cent of the acid-soluble oil fraction distills below about 300° F. and about 90 volume per cent below about 950 or 1000° F.

*Example III*

A 4.5-liter steel bomb was charged with 273 grams of acid-soluble oil, 913 grams of commercial anhydrous hydrofluoric acid, and 926 grams of C. P. isobutane. The bomb was placed on a platform rocker and fitted with a suitable pressure gauge. The bomb was continuously agitated and heated from 30 to 122° C. for 120 minutes. The pressure increased from 70 to 800 pounds per square inch gage. The charged bomb was removed from the rocker and placed in a vertical position. The bomb contents were allowed to cool and settle for about 16 hours. The acid and hydrocarbon layers were withdrawn. The hydrocarbon layer was washed with caustic solution to remove hydrogen fluoride and was warmed and stirred to remove isobutane. The hydrocarbon layer was then dried. The dried hydrocarbon material was placed in a 125-ml. distilling flask and distilled. 67 per cent by volume of the charge distilled below 410° F. (first drop at 112° F.) The residue had lubricating oil properties.

A sample of the untreated acid-soluble oil when distilled under similar conditions yielded only 8 per cent by volume of the charge as distillate below 410° F.

Although this invention has been described with particular reference to a hydrocarbon conversion carried out in a particular manner, various modifications and applications will be clear to those skilled in the art, which may be practiced without departing from the scope of this invention.

Having described my invention, I claim:

1. A process for the conversion of an acid-soluble oil obtained from the acid phase of a process for the alkylation of an isoparaffin with an olefin in the presence of hydrofluoric acid as a catalyst, which comprises primarily alkylating an isoparaffin with said acid soluble oil having an A. P. I. gravity between about 15 and about 30, an iodine number between about 100 and about 175 and a 10-90 volume per cent boiling range between about 300 and 1000° F. in the presence of hydrofluoric acid as the catalyst and in the substantial absence of low-boiling olefins at a temperature between 150 and 400° F. under alkylation and disproportionation conditions such that a gasoline fraction comprising paraffinic hydrocarbons boiling in the gasoline range and a lubricating oil fraction are produced, and recovering said gasoline fraction and said lubricating oil fraction as products of the process.

2. A process for the conversion of the acid-soluble oil obtained from the acid phase of a process for the alkylation of an isoparaffin with an olefin in the presence of hydrofluoric acid as a catalyst, which comprises primarily alkylating an isoparaffin with said acid-soluble oil in the presence of hydrofluoric acid as a catalyst and in the substantial absence of low-boiling olefins under alkylation and disproportionation conditions such that a gasoline fraction comprising paraffinic hydrocarbons boiling in the gasoline range and a lubricating oil fraction are produced, maintaining a temperature between about 150 and about 400° F. and a pressure between about 100 and about 2000 pounds per square inch gage, maintaining a mol ratio of isoparaffin to acid-soluble oil of at least 4:1, maintaining a volume ratio of hydrofluoric acid to hydrocarbons between about 0.5:1 and about 4:1, and recovering said gasoline fraction and said lubricating oil fraction as products of the process.

3. A process for the conversion of acid-soluble oil, which comprises primarily alkylating an isoparaffin with an acid soluble oil having an A. P. I. gravity between about 15 and about 25, an iodine number between about 100 and about 175 and a 10-90 volume per cent boiling range between about 300 and about 1000° F. in the presence of hydrofluoric acid as the catalyst and in the substantial absence of low-boiling olefins under alkylation and disproportionation conditions such that a gasoline fraction comprising paraffinic hydrocarbons boiling in the gasoline range and a lubricating oil fraction are produced, maintaining a temperature between about 150 and about 400° F. and a pressure between about 100 and about 2000 pounds per square inch gage, maintaining a mol ratio of isoparaffin to acid-soluble oil of at least 4:1, maintaining a volume ratio of hydrofluoric acid to hydrocarbons between about 0.5:1 and about 4:1, and recovering said gasoline fraction and said lubricating oil fraction as products of the process.

4. A process for the conversion of the acid-soluble oil obtained from the acid phase of a process for the alkylation of a low-boiling isoparaffin with an olefin in the presence of hydrofluoric acid as a catalyst, which comprises primarily alkylating a low-boiling isoparaffin with said acid soluble oil in the presence of a fluid alkylation catalyst and in the substantial absence of low-boiling olefins at a temperature between 150 and 400° F. under alkylation and disproportionation conditions such that a gasoline fraction comprising paraffinic hydrocarbons boiling in the gasoline range and a lubricating oil fraction are produced, and recovering said gasoline fraction and said lubricating oil fraction.

5. A process for the conversion of the acid-soluble oil obtained from the acid phase of a process for the alkylation of a low-boiling isoparaffin with an olefin in the presence of hydrofluoric acid as a catalyst, which comprises primarily alkylating a low-boiling isoparaffin with said acid soluble oil in the presence of hydrofluoric acid as the catalyst and in the substantial absence of low-boiling olefins at a temperature between 150 and 400° F. under alkylation conditions such that a lubricating oil fraction is predominately produced, and recovering said lubricating oil fraction as a product of the process.

6. A process for the conversion of acid-soluble oil which comprises primarily alkylating an isoparaffin with said acid-soluble oil in the presence of hydrofluoric acid as the catalyst and in the substantial absence of low-boiling olefins at a temperature between 150 and 400° F. under alkylation and disproportionation conditions such that paraffinic hydrocarbons boiling in the gasoline range and in the lubricating oil range are produced and separately recovering said paraffinic hydrocarbons as products of the process.

7. A process for the production of a high octane quality motor fuel which comprises in a first alkylation step reacting isobutane with a butylene in the presence of hydrofluoric acid under alkylation conditions such that higher boiling hydrocarbons boiling in the gasoline range are produced by the alkylation thereof, separating from a resulting effluent from said first alkylation step an alkylate fraction comprising said higher boiling hydrocarbons and a hydrofluoric acid phase containing acid-soluble oil as a by-product of said first alkylation step, separating said acid-soluble oil from said acid phase from said first alkylation step, in a separate second conversion step reacting isobutane with said acid-soluble oil in the presence of hydrofluoric acid and in the substantial absence of low-boiling olefins under alkylation and disproportionation conditions such that paraffinic hydrocarbons boiling in the gasoline range are produced, maintaining a temperature of reaction between about 150 and about 300° F. and a pressure between about 650 and about 900 pounds per square inch gage, separating from a resulting effluent from said second conversion step a gasoline fraction comprising said paraffic hydrocarbons, and combining said alkylate fraction from said first alkylation step with said gasoline fraction from said second conversion step to form a high octane quality motor fuel.

8. A process for the production of a high octane quality motor fuel which comprises in a first alkylation step reacting an isoparaffin with an olefin in the presence of hydrofluoric acid under alkylation conditions such that higher boiling hydrocarbons boiling in the gasoline range are produced by the alkylation thereof, separating from a resulting effluent from said first alkylation step an alkylate fraction comprising said higher boiling hydrocarbons and a hydrofluoric acid phase containing acid-soluble oil as a by-product of said first alkylation step, separating said acid-soluble oil from said acid phase from said first alkylation step, in a separate second conversion step reacting an isoparaffin with said acid-soluble oil in the presence of hydrofluoric acid and in the substantial absence of low-boiling olefins at a temperature between 150 and 400° F. under alkylation and disproportionation conditions such that paraffinic hydrocarbons boiling in the gasoline range are produced, separating from a resulting effluent from said second conversion step a gasoline fraction comprising said paraffinic hydrocarbons, and combining said alkylate fraction from said first alkylation step with said gasoline fraction from said second conversion step to form a high octane quality motor fuel.

9. A process for the preparation of motor fuel and lubricating oil which comprises reacting an isoparaffin with an acid-soluble oil in the presence of hydrofluoric acid and in the substantial absence of low-boiling olefins at a temperature between 150 and 400° F. and under alkylation and disproportionation conditions such that disproportionation reactions predominate with the primary formation of paraffinic hydrocarbons in the gasoline range and with the formation of minor portions of lubricating oil, and separately recovering said gasoline fraction and said lubricating oil.

10. A process for the production of a high octane quality motor fuel boiling in the gasoline range and of an improved lubricating oil which comprises in a first alkylation step reacting an isoparaffin with an olefin in the presence of hydrofluoric acid under alkylation conditions such that higher boiling hydrocarbons boiling in the gasoline range are produced by the alkylation thereof, separating from a resulting effluent from said first alkylation step an alkylate fraction comprising said higher boiling hydrocarbons and a hydrofluoric acid phase containing acid-soluble oil as a by-product of said first alkylation step, separating said acid-soluble oil from said acid phase from said first alkylation step, in a separate second conversion step reacting an isoparaffin with said acid-soluble oil in the presence of hydrofluoric acid and in the substantial absence of low-boiling olefins at a temperature between 150 and 400° F. under alkylation and disproportionation conditions such that paraffinic hydrocarbons boiling in the gasoline range are produced, separating from a resulting effluent from said second conversion step a gasoline fraction comprising said paraffinic hydrocarbons and a lubricating oil, combining said alkylate fraction from said first alkylation step with said gasoline fraction from said second conversion step to form said high octane quality motor fuel, and separately recovering said lubricating oil.

PAUL H. CARNELL.

REFERENCES CITED

The following references are of record in the file of this patent:

UNITED STATES PATENTS

| Number | Name | Date |
|---|---|---|
| 2,371,341 | Matuszak | Mar. 13, 1945 |
| 2,379,022 | Matuszak | June 26, 1945 |
| 2,414,626 | Allen | Jan. 21, 1947 |